Feb. 19, 1952 J. P. TRUSCOTT 2,586,580
HEAT SEALED WRAPPING MACHINE AND METHOD OF WRAPPING
Filed April 6, 1948 2 SHEETS—SHEET 1

INVENTOR.
JOHN P. TRUSCOTT
BY
*P.M.Waters*
ATTORNEY

Feb. 19, 1952     J. P. TRUSCOTT     2,586,580
HEAT SEALED WRAPPING MACHINE AND METHOD OF WRAPPING
Filed April 6, 1948     2 SHEETS—SHEET 2
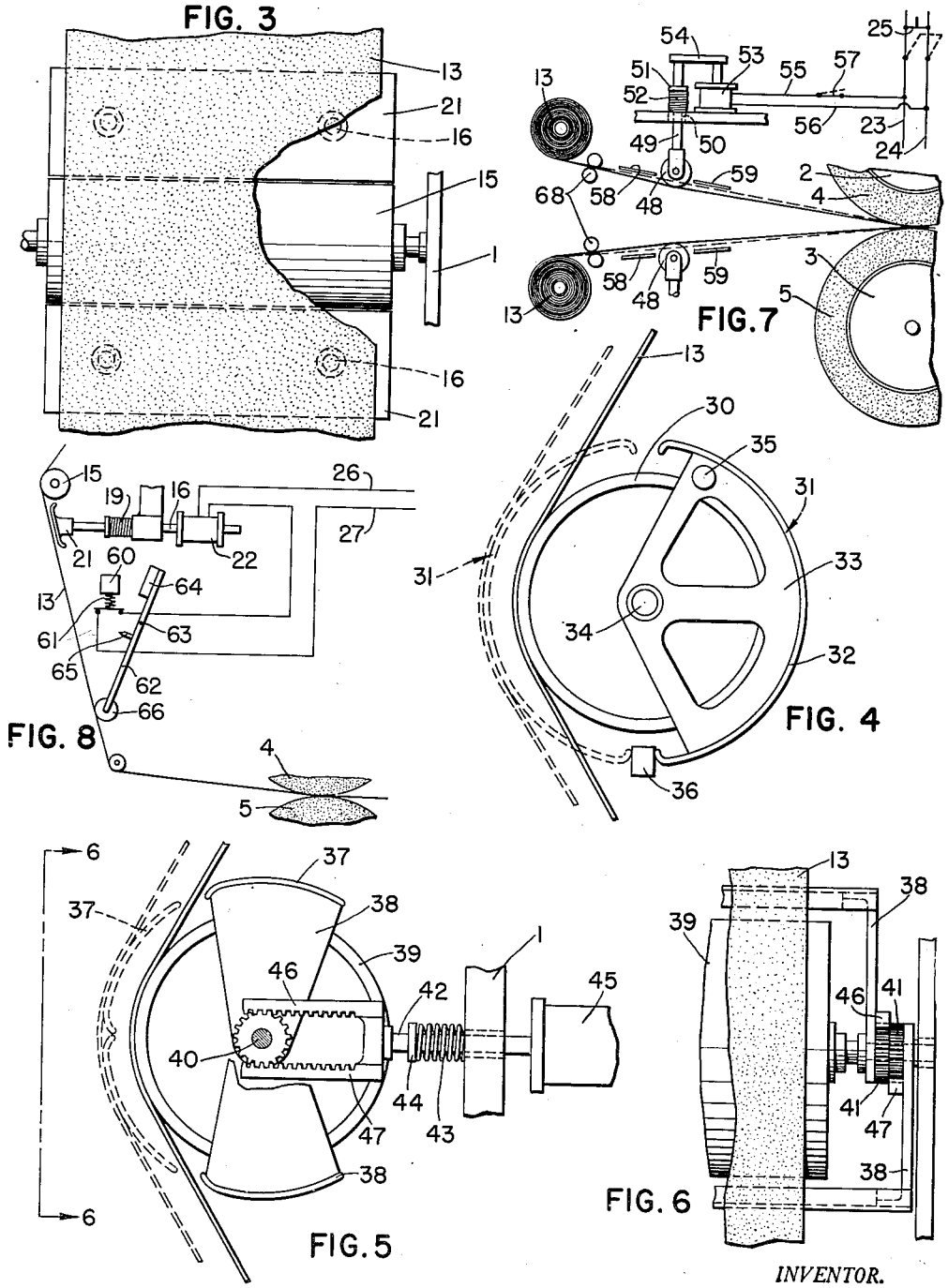
INVENTOR.
JOHN P. TRUSCOTT
BY
ATTORNEY Patented Feb. 19, 1952

2,586,580

UNITED STATES PATENT OFFICE 2,586,580

HEAT SEALED WRAPPING MACHINE AND METHOD OF WRAPPING

John P. Truscott, Akron, Ohio, assignor to Wingfoot Corporation, Akron, Ohio, a corporation of Delaware Application April 6, 1948, Serial No. 19,385

12 Claims. (Cl. 53—14)

1

The present invention relates to wrapping machines and particularly to that class of machines employing a rubber hydrochloride film for a wrapping material. A particular object of the invention is to provide means for heating the wrapping material prior to the wrapping operation in order to condition the material so that it becomes "tacky" and will seal itself along meeting edges or surfaces when the material is wrapped about an object.

Another object of this invention is to provide a heating element for heating the wrapping material prior to the wrapping operation and to provide means for moving the material at selected times away from the heating element to prevent heating of the film.

Another object of this invention is to provide a method of heating a heat-sealable film, as it moves into wrapping position, by a heated element, and in separating the film and heating element at selected intervals to avoid the injurious heating of the film. This may be done by moving the heating element or the material or both.

Various machines have been devised for wrapping articles in heat-sealable films and one of these is illustrated in the Clunan Patent No. 2,340,260.

In such machines where the material passes over a heated element, preferably a heated roll, the film will be excessively heated if, upon stopping the machine, the material is not moved out of engagement with the heating element. It is therefore a primary object of this invention to provide means for accomplishing this result.

Other objects of this invention will appear hereinafter as the description proceeds; the novel features, arrangements and combinations being clearly pointed out in the specification and in the claims thereunto appended.

In the drawings:

Fig. 3 is a fragmentary side elevation looking from the left in Fig. 1;

Fig. 4 is a front elevation of a modification of the shield to be used with the machine illustrated in Fig. 1;

Fig. 5 is a view similar to Fig. 4, showing a further modification;

Fig. 6 is a fragmentary side elevation looking from the left of the modification illustrated in Fig. 5;

Fig. 7 is a fragmentary front elevation of a further modification; and

Fig. 8 is a fragmentary front elevation of a further modification of my invention.

Figures 1, 2:
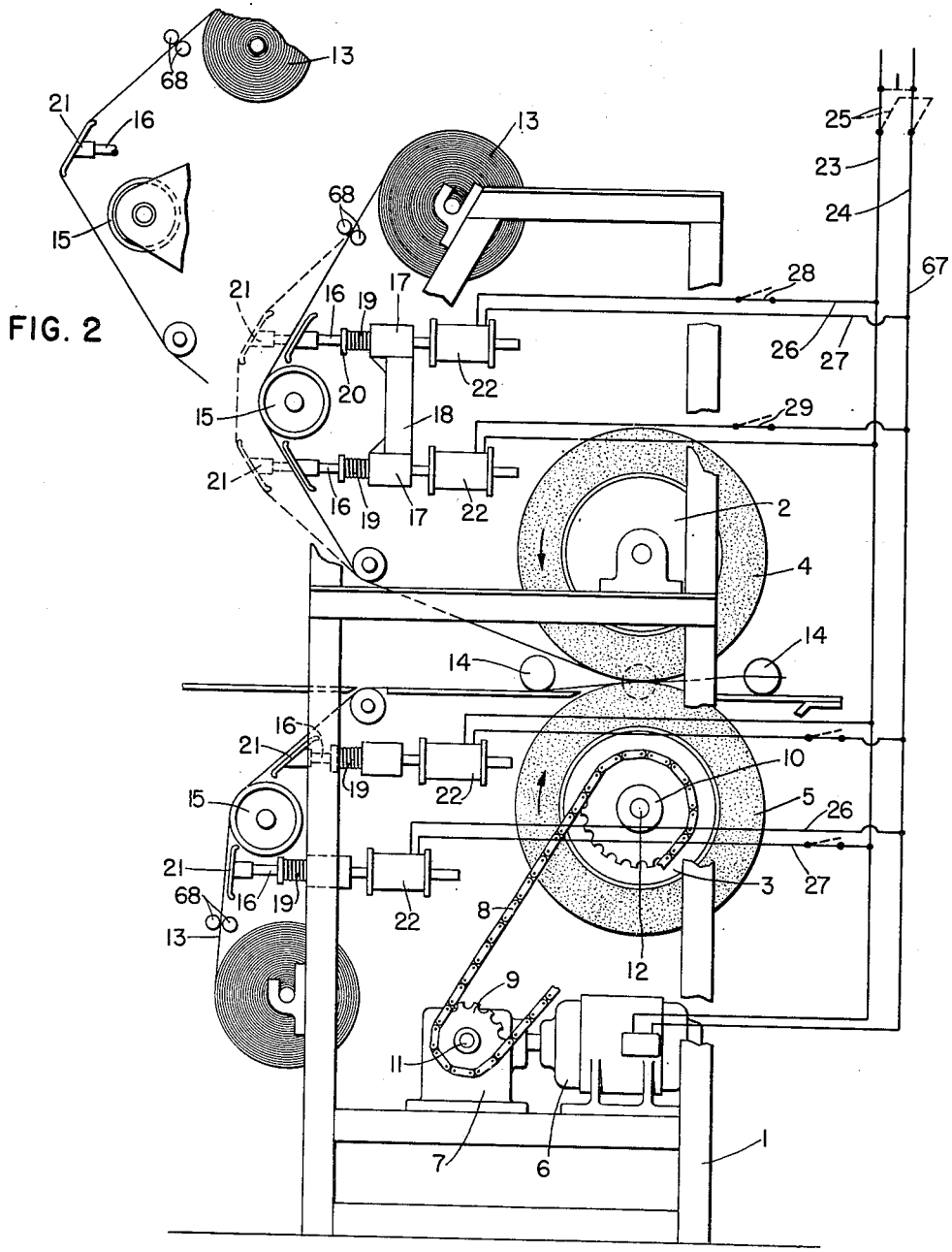
Fig. 1 is a front elevation of a machine embodying my invention.
Fig. 2 is a fragmentary front elevation showing a slight modification of the mechanism shown in Fig. 1.

In the drawings I have shown a simple wrapping machine embodying the use of two layers of heat-sealable material, such as the rubber-hydrochloride film known as "Pliofilm," which is manufactured by The Goodyear Tire & Rubber Co. of Akron, Ohio. I have illustrated the machine being used for wrapping such articles as oranges or the like, but it is to be understood that the invention is not limited to the type of machine shown in the drawing. The frame of the machine is indicated generally by the reference character 1, and on this frame are mounted two rolls 2 and 3, the outer surfaces of which are covered with deep layers 4 and 5 of relatively soft material such as sponge rubber or the like, which are yieldable so as to conform to the shapes of the objects being wrapped. These rolls are driven by a motor 6 operating through reduction gearing 7 to a chain drive 8, the latter being trained over gears 9 and 10 connected respectively to a shaft 11, operated by the reduction gearing 7 and a shaft 12, which carries the lower roll 3. The upper roll 2 may be driven by suitable mechanism from the motor 6 or from the shaft 12; but as illustrated, that roll is not positively driven, but is driven by the frictional contact between the sponge rubber surfaces 4 and 5. The details of the drive are immaterial except that the rolls 2 and 3 are adapted to rotate in opposite directions as indicated by the arrows thereon.

Two rolls of heat-sealable material 13 on the upper and lower parts of the frame supply the material for the wrapping operation. This material is fed to a position between the layers, 4 and 5, and an object such as 14 is arranged in the bite between the two layers, 4 and 5, so as to carry the article between the surfaces of the rolls 2 and 3. The rolls 2 and 3 press the two layers of material, which at this stage are in a heated condition, around the object and against each other into sealing relation to enclose the article in the manner illustrated at the right in Fig. 1.

The mechanism for applying heat to the upper and lower layers of heat-sealable material is substantially identical and a description of one will suffice. Similar reference characters apply to similar parts throughout. The description will be made of the mechanism for heating the upper layer of material. A roller such as 15 is mounted to rotate about an axis which extends at right angles to the direction of movement of said material. As shown in the drawings, this is in a horizontal position. Suitable means (not shown) is provided for heating the roller 15 and for maintaining it at the desired temperature. Such mechanisms are not new in and of themselves, and it is not believed that any illustration thereof is necessary. As the material passes over the heated roller it is heated so as to make it tacky whereby it will seal against the other layer of film when brought into contact therewith. As illustrated, this roller is shown as being driven by the material itself, but it is preferable to have a positive drive for the roller which will drive it at substantially the same surface speed as the linear speed of the material being used.

While the machine is in operation it is not necessary to move the material out of contact with the heated roller because the film is moved constantly over the surface of the roller and gets the necessary heat from the roller. However, if the machine is stopped, the material, being in contact with the roller, will be heated to a greater extent than desired with the result that the material will not be in a condition suitable for wrapping and sealing. With a film such as "Pliofilm," the film becomes excessively heated and burned through in a relatively short time, thus practically severing the strip of material. Furthermore, the material tends to cling to the heated roller and the roller must be cleaned before the apparatus can again be used. The strip of material must then be threaded through the machine once more before the machine can be operated. For this reason, during the time that the machine is shut down or at any other selected times, it is desirable to provide means for moving the film out of contact with the heated roller.

In the embodiment of the invention shown in Figs. 1, 2, and 3, I have mounted a pair of rods 16 so that they are mounted horizontally in bearings 17 in the bracket 18 carried by the frame of the machine. The motion that may be imparted to these rods is from right to left and from left to right, as viewed in Fig. 1. Springs 19 abutting against the collars 20 and 17 normally urge the rods to the left. Thus, if there was no other restraining force, the rods would normally be extended to the left and the shoes 21 mounted on the ends thereof would be in the dotted line position shown in Fig. 1. In order to move the rods to the right (or solid line position), I provided the solenoids 22 mounted on the frame of the machine and surrounding the rods 16. These solenoids are so designed as to draw the rods to the right when the solenoids are energized.

The motor is supplied with electricity through the line 23—24 which constitutes the main line circuit. For the sake of illustration, a double-pole knife switch 25 is shown in this line for the purpose of cutting off the supply of current to the motor. In other words, when the switch 25 is closed the motor will operate to drive the mechanism of the machine. Each of the solenoids is supplied with electricity from the main line 23—24 through their respective circuits 26—27 which are identical. These circuits are provided with switches 28 and 29 which may be used to open or close the circuits to the solenoids.

In normal operation the switches 28 and 29 are closed, and before the machine is started, the switch 25 is open, cutting off the supply of electricity to the motor and to the solenoids. In this non-operative condition of the machine the shoes 21 are in the dotted line positions and the film 13 is thereby held away from the heated roller 15 by the springs 19. When the switch 25 is closed, the material begins to feed between the soft surfaces on the rolls 2 and 3 and the solenoids become operative to move the shoes 21 to the full line positions shown. This brings the material into contact with the heated roller to condition it properly for the wrapping operation. When the machine is stopped by opening the switch 25, the solenoids will be de-energized and the springs 19 will move the shoes 21 to the dotted line positions to prevent damage to the wrapping material. It will be understood that, while not illustrated in the drawings, the lower solenoids are also provided with similar electrical connections to the main power line 23—24. If, during the operation of the machine, it becomes necessary to throw the film out of contact with the heated roller for any reason, while continuing the operation of the rest of the machine, it is only necessary to open the switches 28 and 29 to break the circuits for the solenoids. It will be understood that some other form of heated element such as a smooth, stationary plate may be substituted for the roller 15.

Thus, it will be seen that means is provided which may be automatically or selectively moved in a direction to carry the wrapping material away from the heated roller when desired, and the specific form of the invention shown is used for illustration only and should not be considered as limiting applicant's invention, as various modifications may be employed for this purpose, some of which are shown in the other views.

In Fig. 2 I have shown a fragmentary modification of the mechanism shown in Fig. 1 in which only one shoe 21 is employed. In order that this one shoe may accomplish the results of the two shoes shown in Fig. 1, it is necessary to give it a substantially greater amount of movement to the left and therefore the length of the spring used will have to be increased. However, this can be done by anyone skilled in the art of mechanics. Similar reference characters in this figure refer to similar parts in Fig. 1. A further advantage of having one shoe contact the film, as illustrated, is that the shoe is contacting the cold film and therefore there is not the tendency for this material to adhere to the shoe 21. In Fig. 1 the shoe 21, which contacts the material on the lower side of the upper roller 15, contacts the heated material which at this point is "tacky" and tends to cling to the shoe.

In Fig. 4 I have shown a very simple modification of the invention illustrated in Fig. 1, this being hand operated, but, if desired, capable of being power operated as in Fig. 1. The roller 30 over which the material 13 travels is similar to the roller 15 in Fig. 1. Pivoted to the shaft on which the roller rotates, is an oscillatable shield 31 which has an outer curved surface 32 connected by web-like members 33 at each end of the roller to the shaft 34 upon which it oscillates. A handle 35 on the web-like member 33 may be grasped by the operator and turned in a counter-clockwise direction to the dotted line position shown in Fig. 4 to move the wrapping material out of contact with the heated roller 30. A stop 36 mounted in fixed position on the frame of the machine will stop the clockwise or counter-clockwise rotation of the shield in the dotted and full line positions illustrated and the weight of the shield will hold it in that position until it is manually moved.

In Figs. 5 and 6, I have shown a further modification of the invention in which I employ two arcuate-shaped shields 37 carried by webs 38, straddling the heated roller 39 and rotating about the shaft 40 as an axis. One of the webs on each of the shields is provided with a gear rigidly connected thereto. These gears are designated by the reference character 41 and, as shown in Fig. 6, are attached to the adjacent webs 38 so as to move therewith. A rod 42, similar to the rods 16 in Fig. 1, is mounted to slide in the frame 1, being actuated by a spring 43 abutting against a collar 44 on the rod and against the frame 1. This spring is adapted to move the rod to the left and a solenoid 45, similar to the solenoids 22 in Fig. 1, is adapted to move the rod to the right in the same manner as described in connection with the form of the invention shown in Fig. 1. The left end of the rod 42 carries two racks 46 and 47, the upper rack 46 engaging the gear 41 attached to the lower shield and the rack 47 engaging the gear attached to the upper shield, as is best illustrated in Fig. 6. Thus, upon actuation of the rod 42, the shields rotate into the dotted line positions illustrated in Fig. 5, and when the solenoid 45 is operated, the shields are retracted to the positions illustrated in full lines in Fig. 5.

In Fig. 7, I have shown a further modification of the invention in which the heated roller 48 is moved away from contact with the wrapping film when the machine is shut down or at selected times to prevent damage to the film due to excessive heating. This modification may be used when the wrapping material is fed directly from rolls of material 13 to roll layers 4 and 5 without the use of intermediate direction changing means as in Fig. 1.

In this modification, I have mounted the heated roller on rod 49 which is mounted vertically in a bearing 50, carried by the frame of the machine. The motion that may be imparted to the rod is up and down, as viewed in Fig. 7. A spring 52, abutting against collars 50 and 51, normally urges the rod upward. If there was no other restraining force, the rod would normally be in the upper position and the heated roller 48 would be in the dotted line position shown in Fig. 7.

In order to move the rod down, I have provided a solenoid 53 mounted on the frame of the machine surrounding a rod of the bracket 54, attaching to the rod 49, so as to move the rod 49 downward when the solenoid is energized. The solenoid is supplied with electricity from the main line 23—24 through its circuit 55—56. The circuit is provided with a switch 57 which may be used to open or close circuit to the solenoid.

In normal operation, the switch 57 is closed and before the machine is started, the switch 25 in the main line is open, cutting off the supply of electricity to the motor and to the solenoid. In this non-operative position the heated roller 48 is held in the dotted line position by spring 52 and film 13 is not in contact with the heated roller. When the switch 25 is closed, the material begins to feed between the soft layers 4 and 5 of the rolls 2 and 3 and the solenoid becomes operative to move the heated roller 48 into the solid line position. This brings the heated roller 48 into contact with the material to condition it properly for the wrapping operation. When the machine is stopped by opening switch 25, the solenoid 53 will be de-energized and the spring 49 will move the heated roller 48 away from the film to prevent damage to the wrapping material.

The plates 58 and 59 are attached to the frame of the machine and prevent the film from clinging to the heated roller 48 when the roller is retracted. Preferably, the one plate 58 is desirable because it contacts the cold film, but plate 59 can also be used, if necessary.

It will be understood that, while not illustrated, the lower heated roller is also provided with similar electrical connections to the main power line 23—24. If, during the operation of the machine, it becomes necessary to throw the heated roller out of contact with the film for any reason while continuing the operation of the machine, it is only necessary to open the switch 57 to break the solenoid circuit.

In all modifications of the invention previously described, no means has been provided to stop the feed mechanism or throw the film out of contact with the heated roller or both in the event that the film breaks during the operation of the machine.

In Fig. 8, I have shown by way of example, a mechanism that will, if the film is broken, become operative to throw the film out of contact with the heated roller. In this figure, the same reference numerals apply to similar parts shown in Fig. 1.

In the normal operation of the machine, the switch 60 in the solenoid circuit 26—27, is held closed by spring 61 and the solenoid 22 is operative to hold the shoe 21 away from the film 13. Means are provided to move the film 13 out of contact with the heated roler 15 if the film should break. Said means consists of an arm 62 which rotates about pivot 63 in a clockwise direction due to the weight 64 if the film breaks, and projection 65 on the arm 62 engages the switch 60 to open it, thus de-energizing solenoid 22 and permitting the spring 19 to move the shoe 21 to the left, which, in turn, moves the film 13 out of contact with the heated roller 15.

When the break in the film 13 is repaired and the film is again threaded through the machine, the roller 66 on arm 62 will again ride in contact with the film to hold the arm 62 in the position shown, thus permitting the switch 60 to close and energize the solenoid 22 to draw shoe 21 to the right and allow the film 13 to again contact the heated roller 15.

As a matter of simplicity, only one solenoid circuit was included in the wiring diagram of Fig. 8, but it is to be understood that each solenoid circuit is to be included similarly in the circuit so as to open all of the solenoid circuits when the film breaks. It is also to be understood that the lower web of film (not shown in this view) will have a similar mechanism included to become operative if that film should break.

The previously described mechanism can be similarly installed to operate the line circuit 23—24 at point 67 (shown in Fig. 1) if the film should break. This would not only de-energize the solenoids 22 and move the film out of contact with the heated roller 15, but also stop the entire machine.

In all modifications of the invention, a pair of rolls 68 may be used to more accurately define the path of travel of the film as it leaves the material roll 13 to insure proper functioning of the other associated mechanisms along the path of movement of the film.

In all forms of the invention the material and the heated roller or rollers are moved relatively away from each other to separate the material and the roller or rollers and this may be done either automatically or manually. It will be understood that any other suitable means may be provided for accomplishing the automatic control instead of employing the electrically controlled means shown, without departing from the spirit of the invention or the scope of the claims hereunto appended.

Having thus fully described my invention, what I claim and desire to secure by Letters Patent of the United States is:

1. In a wrapping machine the combination with means for feeding wrapping material to a wrapping position, of means at said wrapping position for wrapping the material about an object, power means for operating said means, an element arranged to have contact with the wrapping material as it moves to said wrapping position, means for heating said element, a shield movable into engagement with the wrapping material to move the material out of contact with said element and to a position such that the material at the heating position is protected from the direct heat waves of the heating element, a solenoid for normally holding said shoe retracted when said power means is operative, and means operative to move said shield in to operative position upon rendering said solenoid inoperative.

2. A device as set forth in claim 1 in which means is provided for rendering said solenoid inoperative when said power means is inoperative.

3. In a wrapping machine the combination with means for feeding wrapping material to a wrapping position, of means at said wrapping position for wrapping the material about an object, an element arranged to have contact with the wrapping material as it moves to said wrapping position, means for heating said element, and a shield movable into engagement with the wrapping material to move the material out of contact with said element when a break occurs in said wrapping material.

4. In a wrapping machine the combination with means for feeding wrapping material to a wrapping position, of means at said wrapping position for wrapping the material about an object, an element arranged to have contact with the wrapping material as it moves to said wrapping position, means for heating said element, a pair of pivotal shields movable into engagement with the wrapping material from opposite directions to move the material out of contact with said element and shield the material opposed to said heated element from the direct heat waves of said element, and rack and pinion means for operating said shields.

5. A device as set forth in claim 4 in which the racks are carried by a yoke, a spring normally urges said yoke in a direction to move said shields into operative position and in which a solenoid holds said yoke retracted against the operation of said spring only so long as said material is being fed.

6. The method of wrapping articles which comprises the steps of advancing the wrapping material along a path to a wrapping position, wrapping an article with said material at said wrapping position, heating said material by heating means arranged at a given position along its path of movement, and selectively rendering said heating means inoperative by interposing a shield between the material and heating element.

7. The method of wrapping articles which comprises the steps of advancing the wrapping material along a path to a wrapping position, wrapping an article with said material at said wrapping position, heating said material by heating means arranged at a given position along its path of movement, and automatically rendering said heating means inoperative upon stoppage of said wrapping means by interposing a shield between the material and heating element.

8. The method of wrapping articles which comprises the steps of advancing the wrapping material along a path to a wrapping position, wrapping an article with said material at said wrapping position, heating said material by a heated element contacting said material at a given position along its path of movement, and moving a shield between said element and material when the advance of the material ceases.

9. In a wrapping machine the combination with means for feeding wrapping material to a wrapping position, of means at said wrapping position for wrapping the material about an object, power means for operating said means, an element arranged to have contact with the wrapping material as it moves to said wrapping position, means for heating said element, and means for moving the wrapping material relative to said element to separate the same when said power means becomes inoperative, said means for moving said material out of contact with said element comprising a pivoted shoe movable into position between said element and material and said shoe being of a width to substantially protect the metal from the direct action of the heat waves of the heated element.

10. In a wrapping machine the combination with means for feeding wrapping material to a wrapping position, of means at said wrapping position for wrapping the material about an object, power means for operating said means, an element arranged to have contact with the wrapping material as it moves to said wrapping position, means for heating said element, and means for moving the wrapping material relative to said element to separate the same when said power means becomes inoperative, said means for moving said material out of contact with said element comprising two shoes mounted on opposite sides of said element and simultaneously movable to push the material away from said element and into a position between said element and material to provide a shield between the material and element to protect the material from the direct action of the heat waves of the heated element.

11. In a wrapping machine the combination with means for feeding wrapping material to a wrapping position, of means at said wrapping position for wrapping the material about an object, power means for operating said means, an element arranged to have contact with the wrapping material as it moves to said wrapping position, means for heating said element, and means for moving the wrapping material relative to said element to separate the same when said power means becomes inoperative, said means for moving the material out of contact with said element comprising a shoe adapted to engage the material and normally spring pressed toward said material and means rendered inoperative by a stoppage of the feeding means for normally holding said shoe retracted against the action of said spring.

12. A device as set forth in claim 11 in which there is an additional shoe similarly constructed and operated and in which each shoe is mounted to engage the material on opposite sides of said element.

JOHN P. TRUSCOTT.

REFERENCES CITED

The following references are of record in the file of this patent:

UNITED STATES PATENTS

| Number | Name | Date |
|---|---|---|
| 1,984,513 | Wescott | Jan. 13, 1914 |
| 1,135,416 | Walkup | Apr. 13, 1915 |
| 1,266,735 | White | May 21, 1918 |
| 1,626,378 | Armstrong | Apr. 26, 1927 |
| 1,875,975 | Alm | Sept. 6, 1932 |
| 2,051,787 | Foster | Apr. 18, 1936 |
| 2,229,017 | Prisley | Jan. 14, 1941 |
| 2,340,260 | Clunan | Jan. 25, 1944 |
| 2,438,089 | Carson | Mar. 16, 1948 |